United States Patent Office 3,068,299
Patented Dec. 11, 1962

3,068,299
PROCESS FOR THE PREPARATION OF
FLUOROHYDROCARBONS
Travis E. Stevens, Huntsville, Ala., assignor to Rohm &
Haas Company, Philadelphia, Pa., a corporation of
Delaware
No Drawing. Filed Aug. 10, 1960, Ser. No. 48,581
6 Claims. (Cl. 260—653.8)

This invention concerns a process for the preparation of fluorohydrocarbons. More particularly, it concerns a straight-forward process which produces fluorine derivatives in high yields from readily available raw materials.

The term "fluorohydrocarbon" as used throughout this application refers to difluoro or trifluoro aliphatic hydrocarbons. The fluoro group may be the only substituent of the aliphatic hydrocarbon, or the hydrocarbon may be further substituted with halo groups such as fluorine, chlorine, or bromine. The fluorohydrocarbons of the present invention are represented by the formula

in which X is fluorine, hydrogen or methyl and R is selected from the group consisting of lower alkyl, lower haloalkyl in which the halo group has an atomic number from 9 to 35, and lower alkenyl.

The term "lower alkyl" as used throughout the specification and the claims cover alkyl radicals containing 1 to 4 carbon atoms. "Lower haloalkyl" denotes alkyl groups containing 1 to 4 carbon atoms, mono-, di-, or poly-halo substituted, said halo group being fluorine, chlorine or bromine. "Lower alkenyl" as used herein is an alkenyl group containing 2 to 4 carbon atoms.

The type of compounds prepared by the process of the present invention are known in the prior art, having been produced by other processes. Thus, U.S. Patent 2,478,932 covers a process for the preparation of 1,1,1-trifluoroethane by the passage of 1-chloro-1,1-difluoroethane over an aluminum chloride catalyst at temperatures not less than 250° C. and not greater than 500° C. However, only about one-third of the reaction product is 1,1,1-trifluoroethane, the balance being a mixture of chlorinated hydrocarbons and unsaturated hydrocarbons. Other prior art processes which depend on the replacement of a halogen atom (other than fluorine) by fluorine give similar complex mixtures. Direct fluorination of hydrocarbons with elemental fluorine has also been proposed, but the difficulties and dangers inherent in handling fluorine are well-known.

An object of this invention is to provide a process for the preparation of high purity fluorohydrocarbons in high yields. A further object of this invention is to provide a process for the preparation of high purity fluorohydrocarbons from readily available low cost raw materials.

The fluorohydrocarbons produced by the process of the present invention represent a well-known class of compounds with a variety of important uses. Depending on the boiling point, they may be used as propellants in aerosol bombs, or as heat transfer agents in refrigeration systems. When one of the substituents is a $CH_2=CH-$ group, the compound can be polymerized or copolymerized to produce high molecular weight polymers with high fluorine content.

Methyl ketones as described hereinafter will react with $BrF_3$ in the presence of HF or $IF_5$ to yield difluoro hydrocarbons of the general formula

in which $R_1$ may be hydrogen or methyl and $R_2$ is hydrogen or lower alkyl.

The basic reaction is shown by the following equation:

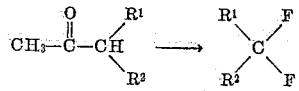

in which $R^1$ is hydrogen or methyl and $R^2$ is hydrogen or lower alkyl. Suitable ketones include acetone, methyl ethyl ketone, methyl propyl ketone and methyl butyl ketone. Whereas in the case of acetone, the reaction produces 2,2-difluoropropane exclusively, the above fragmentation occurs with the higher ketones to produce small amounts of lower molecular weight fluorinated hydrocarbons such as $CH_3CF_3$. These small amounts of lower molecular weight fluorinated hydrocarbons are readily removed from the desired product.

The solvents suitable for the reaction include hydrogen fluoride, iodine pentafluoride, or mixtures thereof. Although iodine pentafluoride can be used as such, it presents operating difficulties due to the fact that it melts at 10° C. and boils at 100° C. Mixtures of iodine pentafluoride with hydrogen fluoride are more easily handled. When mixtures of hydrogen fluoride and iodine pentafluoride are employed, a ratio of HF to $IF_5$ of about 2 to 1 is preferred. Liquid hydrogen fluoride represents, however, the preferred solvent.

The molar ratio of bromine trifluoride to the ketone is not too critical, and it may range from about 2.5 moles to 1 mole to about 1 mole to 1.5 moles. However, a 1 to 1 molar ratio is the theoretical ratio and is often preferred in practice.

The temperature of the reaction mixture can be varied appreciably depending on the particular reactants employed. Thus, it may vary from about −40° C. to about 10° C. A range of from −20° to −10° C. is the preferred operating range.

The reaction between bromine trifluoride and ketones is exothermic, the degree of exothermicity depending on the particular nitrile or ketone being employed. Cooling of the reaction mixture is generally required.

The reaction is conducted in an inert atmosphere; that is, under a nitrogen or helium sweep. Since bromine trifluoride reacts with water, the reactants and the reaction mixture must be maintained in an anhydrous condition.

This application is a continuation-in-part of Serial No. 835,394, filed August 24, 1959, and now U.S. Patent No. 2,972,639.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

*Fluorination of Methyl Ketones*

To two ml. of acetone was added 4 ml. of bromine trifluoride in 40 ml. of hydrogen fluoride cooled to −15°. There was obtained 564 ml. (STP) of 2,2-difluoropropane (93%), vapor pressure 760 mm. at 2.5°, reported B.P. −0.1°. Its molecular weight was 80.3 (calculated, 80). The infrared spectrum of the gas exhibited the splitting of the 1380 cm.$^{-1}$ band characteristic of gem-dimethyl compound; C-F absorption at 1180–1250 cm.$^{-1}$ was present in the spectrum as were 3 triplets centered at 989, 908 and 831 cm.$^{-1}$. The major mass spectrum peaks were at 65 (intensity 100), 51 ($CF_2H^+$, rearrangement peak, 3.8) and 45 (8.5). The proton n.m.r. spectrum had only the triplet expected for the difluoropropane; the F[19] n.m.r. spectrum had 5 fluorine resonance bands at 230 to 310 c.p.s. higher field than external trifluoroacetic acid. Apparently 2 of the 7 bands expected for the difluoropropane structure were hidden by the background. Vapor phase chromatography confirmed the purity of the sample.

When the reaction was carried out by adding the bromine trifluoride to the acetone (2.0 ml.) in hydrogen fluoride, 2,2-difluoropropane (548 ml., 91%), containing a trace of 1,1,1-trifluoroethane (by v.p.c. analysis) was obtained.

EXAMPLE II

Methyl Ethyl Ketone

A solution of 4 ml. of bromine trifluoride in 40 ml. of hydrogen fluoride was treated dropwise with 3.0 ml. (0.0335 mole) of methyl ethyl ketone in the usual fashion. The cold traps collected 688 ml. (STP) (0.0307 mole) of gas. The infrared and mass spectra (strong 69 and 65 m./e. peaks) revealed a mixture of 1,1-difluoroethane and 1,1,1-trifluoroethane. Only two peaks were present in the vapor phase chromatogram; 46% of the peak area was due to the difluoroethane and 54% was due to the trifluoroethane. The retention times were the same as those of authentic samples.

EXAMPLE III

Methyl Isopropyl Ketone

From the addition of 4 ml. of bromine trifluoride to 3.0 ml. (0.028 mole) of methyl isopropyl ketone there was obtained 715 ml. (STP) (0.032 mole) of gas. The infrared and mass spectra identified this as a mixture of 2,2-difluoropropane and 1,1,1-trifluoroethane. The trifluoroethane comprised 59% of the vapor phase chromatogram peak area; the other 41% of the area was due to the difluoropropane. Trace amounts of 3 impurities were revealed by this chromatogram. A portion of the sample was fractionated in vacuo through —130° and 196° traps. The 2,2-difluoropropane was retained at —130°; its infrared spectrum was identical to that of the material produced in the acetone fluorination. 1,1,1-trifluoroethane, identified by infrared and mass spectra, was retained at —196°.

I claim:

1. A process for the preparation of fluorohydrocarbons which comprises reacting bromine trifluoride in an inert anhydrous atmosphere in the presence of a solvent selected from the group consisting of hydrogen fluoride and iodine pentafluoride and mixtures thereof with a compound of the formula

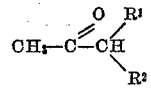

in which $R^1$ is selected from the group consisting of hydrogen and methyl and $R^2$ is selected from the group consisting of hydrogen and lower alkyl and separating the fluorocarbons so formed.

2. A process as set forth in claim 1 in which the solvent is liquid hydrogen fluoride.

3. A process as set forth in claim 1 in which the ratio of bromine trifluoride to compound of the formula

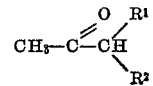

is from about 2.5 to 1 to about 1 to 1.5.

4. A process as set forth in claim 1 in which the reaction temperature is from about —40° C. to +10° C.

5. A process as set forth in claim 1 in which the reaction temperature is from —20° C. to —10° C.

6. A process as set forth in claim 1 in which the inert anhydrous atmosphere is selected from the gases consisting of nitrogen and helium.

References Cited in the file of this patent

UNITED STATES PATENTS 2,702,306    Gall et al. _____ Feb. 15, 1955